(12) United States Patent
Hua

(10) Patent No.: US 11,907,532 B1
(45) Date of Patent: Feb. 20, 2024

(54) OVERLAY METHODS FOR FAST AND DETERMINISTIC RAID RELOCATION SUPPORTING DISK ARRAY GROWTH

(71) Applicant: Dell Products L.P., Hopkinton, MA (US)

(72) Inventor: Kuolin Hua, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/984,281

(22) Filed: Nov. 10, 2022

(51) Int. Cl.
*G06F 3/06* (2006.01)

(52) U.S. Cl.
CPC .......... *G06F 3/0604* (2013.01); *G06F 3/0631* (2013.01); *G06F 3/0689* (2013.01)

(58) Field of Classification Search
CPC ....................................................... G06F 3/06
See application file for complete search history.

(56) References Cited

U.S. PATENT DOCUMENTS

2020/0310644 A1* 10/2020 Hua ...................... G06F 3/0644
2022/0155959 A1* 5/2022 Wang ...................... G06F 3/061

* cited by examiner

*Primary Examiner* — Khoa D Doan
(74) *Attorney, Agent, or Firm* — Anderson Gorecki LLP

(57) ABSTRACT

An initial drive cluster of G drives with G subdivisions is represented by a G*G drive matrix, where G equals the number of data and parity members in the RAID level implemented on the drive cluster. A corresponding G×G overlay matrix is created in which a value at row R, column C equals a remainder of (R+C−2) divided by G, such that there are G distinct values in a range of 0 to G−1. Responsive to addition of N new drives to the drive cluster, the N new drives are added to the drive matrix and the overlay matrix is used to select and relocate RAID members within the drive matrix so that new RAID groups can be created.

20 Claims, 12 Drawing Sheets

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 |   |   |   | D | E |
| 5 |   |   | C | D |   |
| 6 |   | B | C |   |   |
| 7 | A | B |   |   |   |
| 8 | A |   |   |   | E |

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 | p | q | r | D | E |
| 5 | q | r | C | D | p |
| 6 | r | B | C | p | q |
| 7 | A | B | p | q | r |
| 8 | A | p | q | r | E |

Figure 4A

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 5 | A | B | C | D | E |
| 6 |   |   |   |   |   |
| 7 |   |   |   |   |   |
| 8 |   |   |   |   |   |
| 9 |   |   |   |   |   |

| overlay | 1 | 2 | 3 | 4 | 5 |
|---|---|---|---|---|---|
| 1 | 0 | 1 | 2 | 3 | 4 |
| 2 | 1 | 2 | 3 | 4 | 0 |
| 3 | 2 | 3 | 4 | 0 | 1 |
| 4 | 3 | 4 | 0 | 1 | 2 |
| 5 | 4 | 0 | 1 | 2 | 3 |

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 5 | p | q | r | s | E |
| 6 | q | r | s | D | p |
| 7 | r | s | C | p | q |
| 8 | s | B | p | q | r |
| 9 | A | p | q | r | s |

Figure 4B

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 9 |  |  |  |  |  |
| 10 |  |  |  |  |  |
| 4 | p | q | r | D | E |
| 5 | q | r | C | D | p |
| 6 | r | B | C | p | q |
| 7 | A | B | p | q | r |
| 8 | A | p | q | r | E |

| overlay | 1 | 2 | 3 | 4 | 5 |
|---|---|---|---|---|---|
| 1 | 0 | 1 | 2 | 3 | 4 |
| 2 | 1 | 2 | 3 | 4 | 0 |
| 3 | 2 | 3 | 4 | 0 | 1 |
| 4 | 3 | 4 | 0 | 1 | 2 |
| 5 | 4 | 0 | 1 | 2 | 3 |

Figure 5A

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 9 | A | B | C | D | E |
| 10 | A | B | C | D | E |
| 4 | p | q | r |  |  |
| 5 | q | r |  |  | p |
| 6 | r |  |  | p | q |
| 7 |  |  | p | q | r |
| 8 |  | p | q | r |  |

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 9 | A | B | C | D | E |
| 10 | A | B | C | D | E |
| 4 | p | q | r | s | t |
| 5 | q | r | s | t | p |
| 6 | r | s | t | p | q |
| 7 | s | t | p | q | r |
| 8 | t | p | q | r | s |

Figure 5B

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 5 | p | q | r | s | E |
| 6 | q | r | s | D | p |
| 7 | r | s | C | p | q |
| 8 | s | B | p | q | r |
| 9 | A | p | q | r | s |

| overlay | 1 | 2 | 3 | 4 | 5 |
|---|---|---|---|---|---|
| 1 | 0 | 1 | 2 | 3 | 4 |
| 2 | 1 | 2 | 3 | 4 | 0 |
| 3 | 2 | 3 | 4 | 0 | 1 |
| 4 | 3 | 4 | 0 | 1 | 2 |
| 5 | 4 | 0 | 1 | 2 | 3 |

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 10 | | | | | |
| 11 | | | | | |
| 12 | | | | | |
| 13 | | | | | |
| 5 | p | q | r | s | E |
| 6 | q | r | s | D | p |
| 7 | r | s | C | p | q |
| 8 | s | B | p | q | r |
| 9 | A | p | q | r | s |

Figure 6

| disk/# | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 10 | A | B | C | D | E |
| 11 |   |   |   |   |   |
| 12 |   |   |   |   |   |
| 13 |   |   |   |   |   |

| overlay | 1 | 2 | 3 | 4 | 5 |
|---|---|---|---|---|---|
| 1 | 0 | 1 | 2 | 3 | 4 |
| 2 | 1 | 2 | 3 | 4 | 0 |
| 3 | 2 | 3 | 4 | 0 | 1 |
| 4 | 3 | 4 | 0 | 1 | 2 |
| 5 | 4 | 0 | 1 | 2 | 3 |

Figure 7

| disk/# | 1 | 2 | 3 | 4 | 5 |
|--------|---|---|---|---|---|
| 1      | A | B | C | D | E |
| 2      | A | B | C | D | E |
| 3      | A | B | C | D | E |
| 4      |   |   |   | D | E |
| 10     |   |   | C | D |   |
| 11     |   | B | C |   |   |
| 12     | A | B |   |   |   |
| 13     | A |   |   |   | E |

| disk/# | 1 | 2 | 3 | 4 | 5 |
|--------|---|---|---|---|---|
| 1      | A | B | C | D | E |
| 2      | A | B | C | D | E |
| 3      | A | B | C | D | E |
| 4      | t | u | v | D | E |
| 10     | u | v | C | D | t |
| 11     | v | B | C | t | u |
| 12     | A | B | t | u | v |
| 13     | A | t | u | v | E |

Figure 8

OVERLAY METHODS FOR FAST AND DETERMINISTIC RAID RELOCATION SUPPORTING DISK ARRAY GROWTH

TECHNICAL FIELD

The subject matter of this disclosure is generally related to electronic data storage systems.

BACKGROUND

Institutional data storage systems use Redundant Array of Independent Disks (RAID) technology to maintain data availability and avoid data loss. In a simple implementation, individual disk drives are members of RAID protection groups. A RAID protection group enables a failed member to be rebuilt using the remaining non-failed members. A RAID (D+P) protection group has D data members and P parity members. The data members store data. The parity members store non-data parity information such as XORs of the data values on the data members. A failed data member can be rebuilt from the non-failed data members and the parity information. A failed parity member can be rebuilt from the data members. Locating the members of a RAID protection group on different drives therefore avoids data loss when one of the drives fails. A variety of different RAID levels with different numbers, types, and configurations of members are known, some of which can recover from simultaneous failure of multiple members.

The storage capacity of a storage system can be increased by adding new drives and creating new RAID protection groups. When D+P new drives are added, new RAID protection groups can be created on those new drives. However, when fewer than D+P new drives are added, some of the existing protection group members must be relocated to the new drives in order to enable creation of new protection groups. Relocation of protection group members incurs overhead costs because it requires use of computational and memory resources that might otherwise be used to service IOs from host servers that use the data stored by the storage system.

SUMMARY

In accordance with some aspects, an apparatus comprises a plurality of non-volatile drives; at least one compute node configured to manage access of the non-volatile drives, the at least one compute node comprising at least one processor and non-transitory computer-readable memory; and a Redundant Array of Independent Drives (RAID) controller configured to: organize the non-volatile drives into drive clusters, each having G non-volatile drives with G subdivisions, where G equals a number of data members and parity members of an implemented RAID level; create a G*G drive matrix for each of the drive clusters, the drive matrix representing the corresponding drive cluster; create a G×G overlay matrix in which a value at row R, column C equals a remainder of (R+C−2) divided by G, such that there are G distinct values in a range of 0 to G−1; and responsive to addition of N new drives to one of the drive clusters, add the N new drives to the corresponding drive matrix and use the overlay matrix to relocate RAID members within the drive matrix.

In accordance with some aspects, a method comprises organizing non-volatile drives into drive clusters, each having G non-volatile drives with G subdivisions, where G equals a number of data members and parity members of an implemented RAID level; creating a G*G drive matrix for each of the drive clusters, the drive matrix representing the corresponding drive cluster; creating a G×G overlay matrix in which a value at row R, column C equals a remainder of (R+C−2) divided by G, such that there are G distinct values in a range of 0 to G−1; and responsive to addition of N new drives to one of the drive clusters, adding the N new drives to the corresponding drive matrix and using the overlay matrix to relocate RAID members within the drive matrix.

In accordance with some aspects, a non-transitory computer-readable storage medium stores instructions that when executed by a computer perform a method comprising organizing non-volatile drives into drive clusters, each having G non-volatile drives with G subdivisions, where G equals a number of data members and parity members of an implemented RAID level; creating a G*G drive matrix for each of the drive clusters, the drive matrix representing the corresponding drive cluster; creating a G×G overlay matrix in which a value at row R, column C equals a remainder of (R+C−2) divided by G, such that there are G distinct values in a range of 0 to G−1; and responsive to addition of N new drives to one of the drive clusters, adding the N new drives to the corresponding drive matrix and using the overlay matrix to relocate RAID members within the drive matrix.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIG. 4A illustrates use of the overlay matrix for location of new protection group members.

FIG. 4B illustrates use of the overlay matrix for relocation of existing protection group members and location of new protection group members for a different number of new drives.

FIGS. 5A and 5B illustrate use of the overlay matrix for splitting a drive cluster into two drive clusters in response to addition of new drives.

FIGS. 6, 7 and 8 illustrate use of the overlay matrix for expansion over a split.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
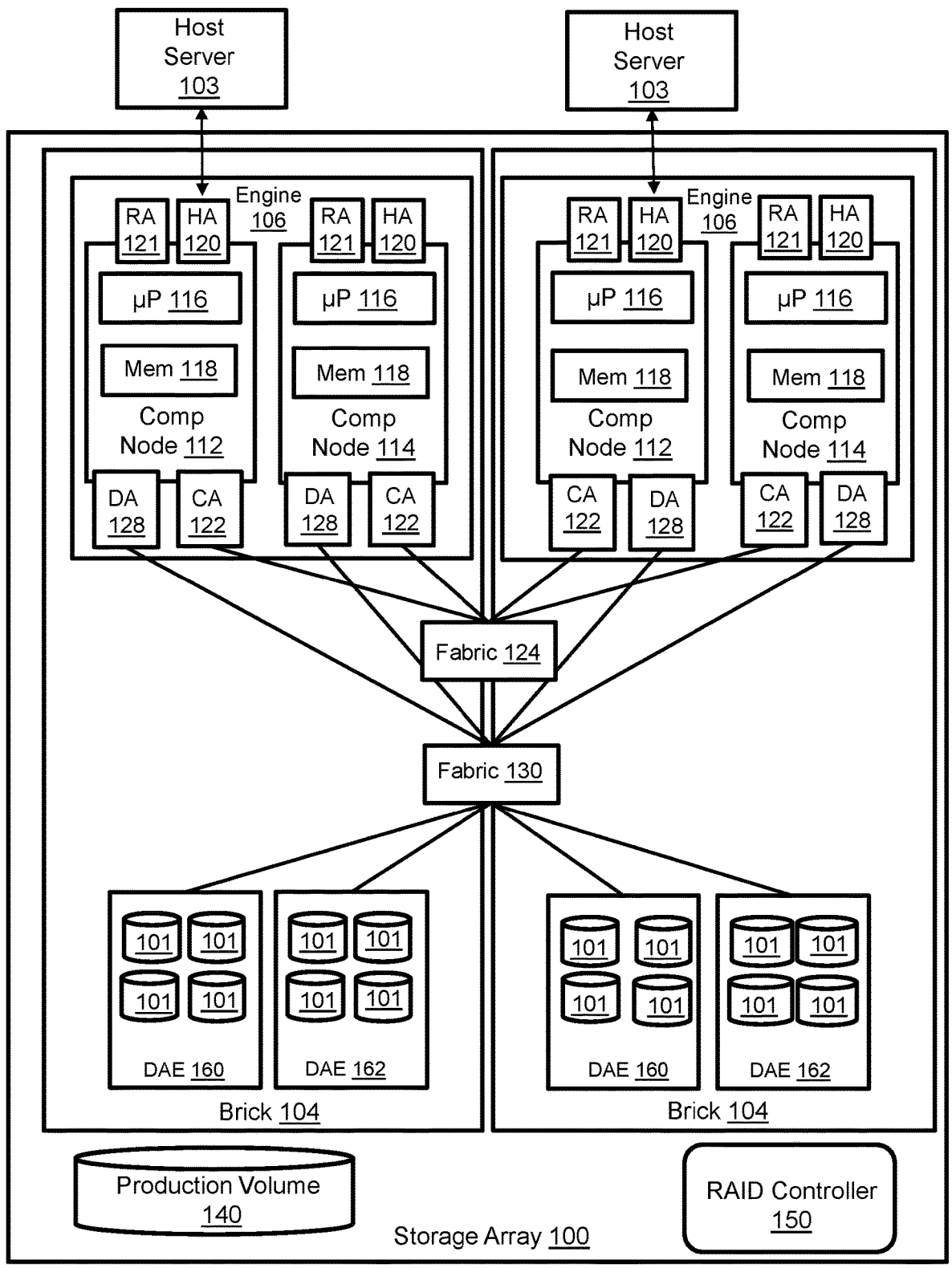
FIG. 1 illustrates a storage array with a RAID controller that relocates protection group members and creates new protection groups in response to addition of new drives.

FIG. 1 illustrates a storage array 100 with a RAID controller 150 that relocates protection group members and creates new protection groups in response to addition of new drives. The storage array 100 is depicted in a simplified data center environment supporting two host servers 103 that run host applications, but the storage array would typically support more than two host servers. The host servers 103 include volatile memory, non-volatile storage, and one or more tangible processors. The storage array 100 includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the host servers 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node is connected to one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node is also connected to a remote adapter (RA) 121 for communicating with other storage systems, e.g., for remote mirroring, backup, and replication. Each compute node may also be connected to one or more channel adapters (CAs) 122 for communicating with other compute nodes via an interconnecting fabric 124. Each compute node is also connected to one or more disk adapters (DAs) 128 for communicating with managed drives 101 in the DAEs 160, 162. Each disk adapter has processors, volatile memory, and ports via which the compute node may access the DAEs for servicing IOs. The managed drives 101 include non-volatile storage media that may be of a single technology type and storage capacity, where technology types may include, without limitation, solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk.

Data associated with instances of the hosted applications running on the host servers 103 is maintained on the managed drives 101. The managed drives are not discoverable by the host servers, but the storage array creates a logical storage object known as a production volume 140 that can be discovered and accessed by the host servers. Without limitation, the storage object may be referred to as a source device, production device, or production LUN, where the logical unit number (LUN) is a number used to identify logical storage volumes in accordance with the small computer system interface (SCSI) protocol. From the perspective of the host servers 103, the production volume 140 is a single disk having a set of contiguous fixed-size logical block addresses (LBAs) on which data used by the instances of the host application resides. However, the host application data is stored at non-contiguous addresses on various managed drives 101. The compute nodes maintain metadata that maps between the logical block addresses of the production volume 140 and physical addresses on the managed drives 101 in order to process IOs from the hosts.

Figure 2:
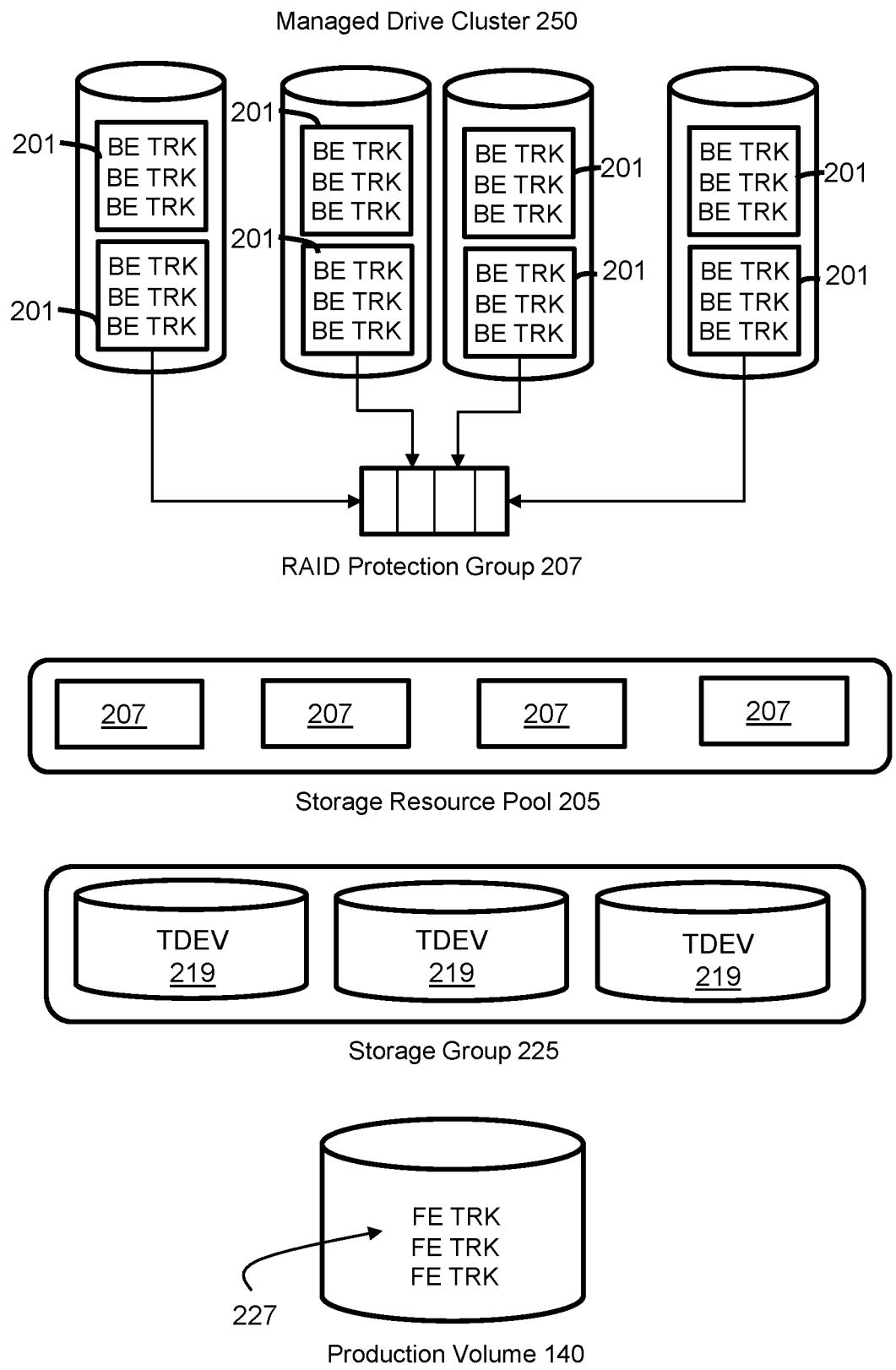
FIG. 2 illustrates layers of abstraction between the managed drives and the production volume of the storage array of FIG. 1.

FIG. 2 illustrates layers of abstraction between clusters of the managed drives and the production volume 140 in greater detail. Referring to FIGS. 1 and 2, the basic allocation unit of storage capacity that is used by the compute nodes 112, 114 to access the managed drives 101 is a back-end track (BE TRK). In some implementations the compute nodes do not access the managed drives using allocation units other than BE TRKs. BE TRKs may all have the same fixed size which may be an integer (greater than 1) multiple of the managed disk sector size. All of the managed drives are organized into same size subdivisions 201, i.e., every subdivision has the same fixed size in terms of storage capacity. The entire disk space may be partitioned into subdivisions. Each subdivision 201 may include multiple BE TRKs. Selection of subdivision storage capacity is a design implementation and, for context and without limitation, may be some fraction or percentage of the capacity of a managed disk equal to an integer multiple of the sector size. Each subdivision may include a contiguous range of logical addresses. A group of subdivisions from different managed drives of the same size within a drive cluster 250 is used to create a RAID protection group 207. The subdivisions accommodate protection group members. In order to be RAID-compliant, each member of a given protection group must be on a different managed drive. All of the managed drives associated with a cluster and RAID protection group have the same storage capacity. A storage resource pool 205 is a collection of RAID protection groups 207 of the same type, e.g., RAID-5 (3+1). Logical thin devices (TDEVs) 219 are created from a storage resource pool and organized into a storage group 225. The production volume 140 is created from one or more storage groups. Host application data is stored in front-end tracks (FE TRKs) 227, that may be referred to as blocks, on the production volume 140. The FE TRKs 227 on the production volume 140 are mapped to BE TRKs 200 of the managed drives by metadata. The storage array may create and maintain multiple production volumes.

Figure 3A:
FIG. 3A illustrates a starting drive matrix and corresponding overlay matrix.

FIG. 3A illustrates a starting drive matrix 300 and a corresponding overlay matrix 302. The RAID controller groups the managed drives into drive clusters, each of which includes all members of the protection groups located therein. Each drive cluster is represented by a drive matrix. Initially, a drive cluster has G drives that each have G subdivisions, where G is the RAID group size, i.e., D+P. The drives are sequentially indexed and represented by rows in the drive matrix. The subdivisions are sequentially indexed and represented by columns in the drive matrix. Members of RAID groups are vertically distributed such that the members of a given RAID group, e.g., RAID group A, reside in a single subdivision index. In the illustrated example, G=5 and five protection groups A, B, C, D, E are located in subdivision indices 1, 2, 3, 4, 5, respectively.

The overlay matrix corresponding to the drive matrix has G rows and G columns, each of which is sequentially indexed with the same index values as the drive matrix. The overlay matrix is populated with values calculated such that the value at row R, column C equals the remainder of (R+C−2) divided by G, such that there are G distinct values in a range of 0 to G−1. In the illustrated example in which G=5, the result is that the overlay matrix 302 is populated with values from 0 through 4. Moreover, the overlay matrix is symmetric because its transposes are identical. As will be explained below, the overlay matrix is conceptually superimposed on the drive matrix to determine how to relocate protection group members and locate new protection group members when new drives are added.

Figure 3B:
FIG. 3B illustrates use of the overlay matrix for relocation of existing protection group members for expansion of storage capacity by fewer than G new drives.
Figure 9:
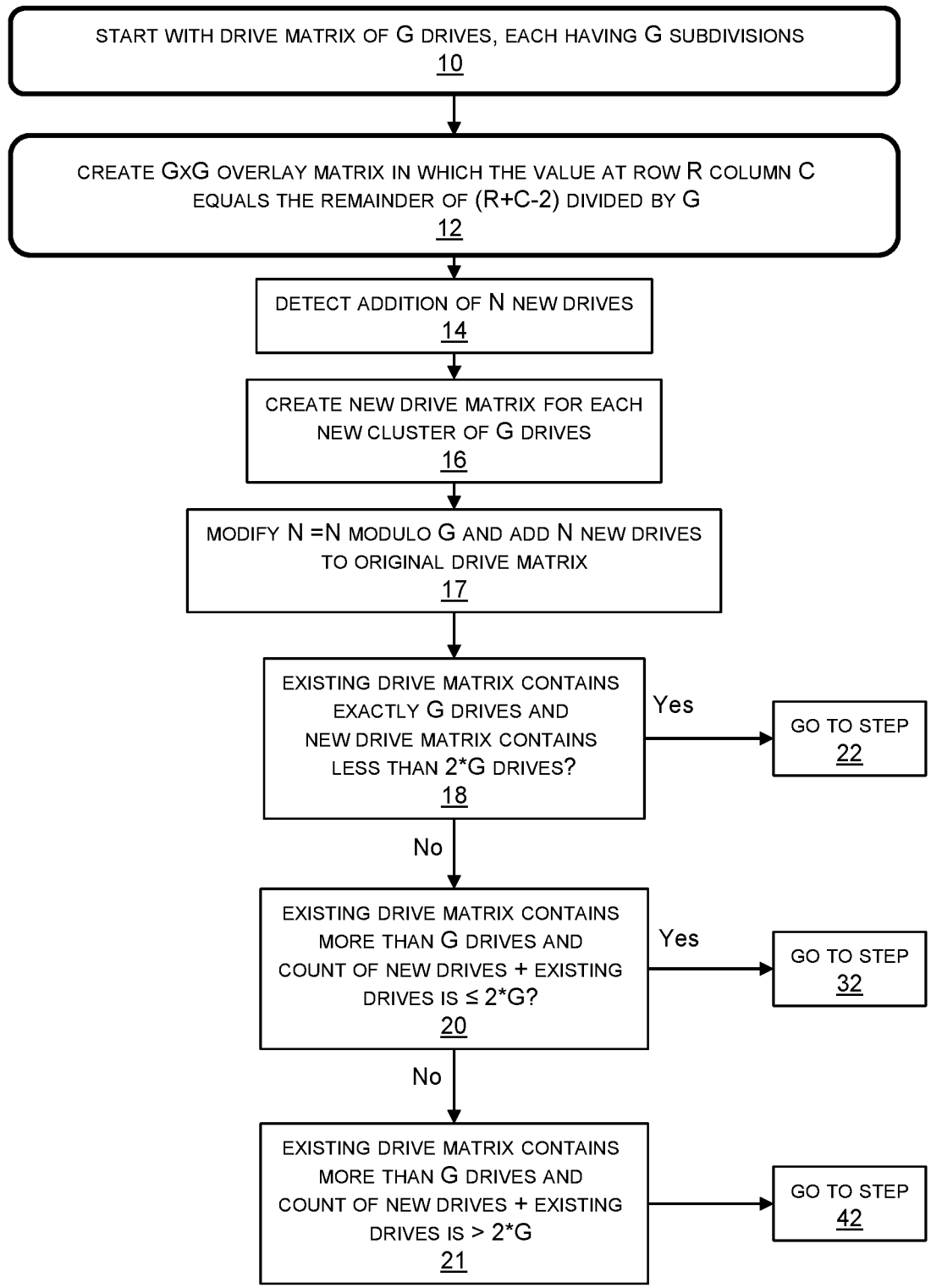
FIGS. 9, 10, 11, and 12 illustrate steps associated with a method performed by the RAID controller.
Figure 10:
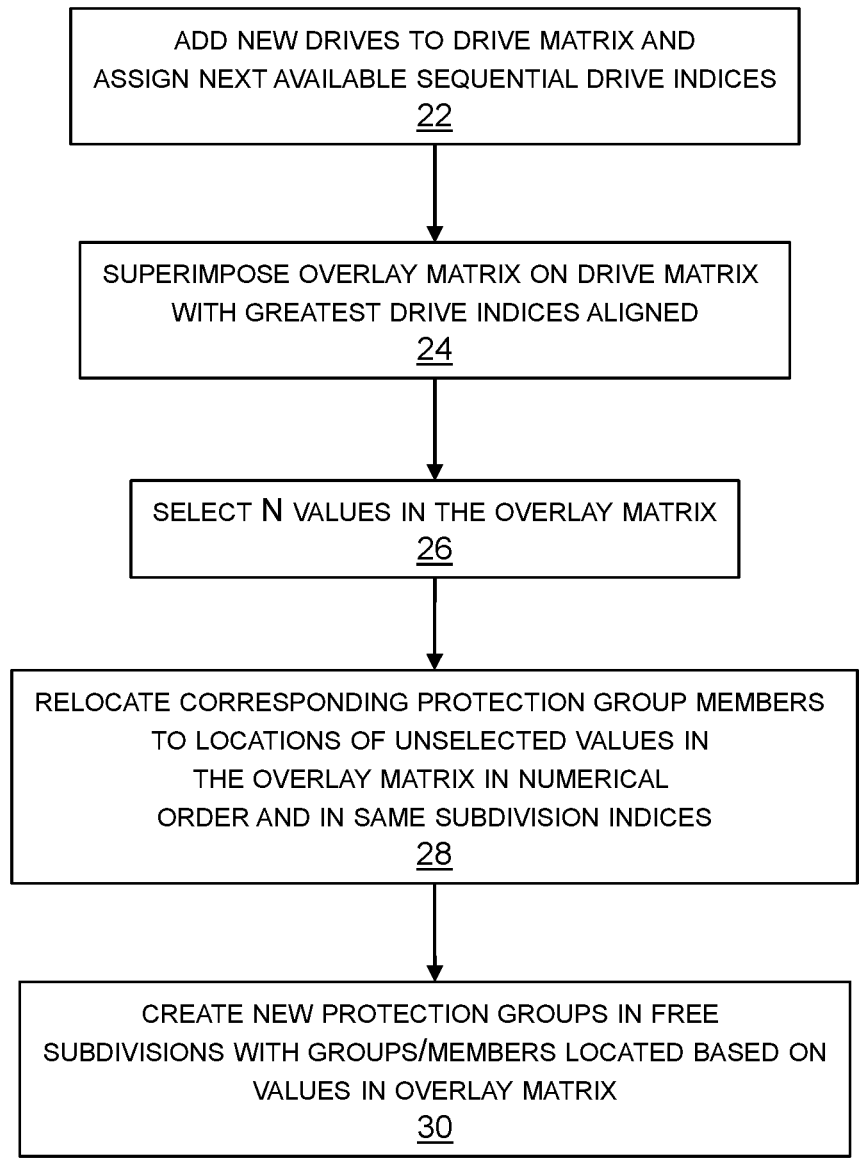
Figure 11:
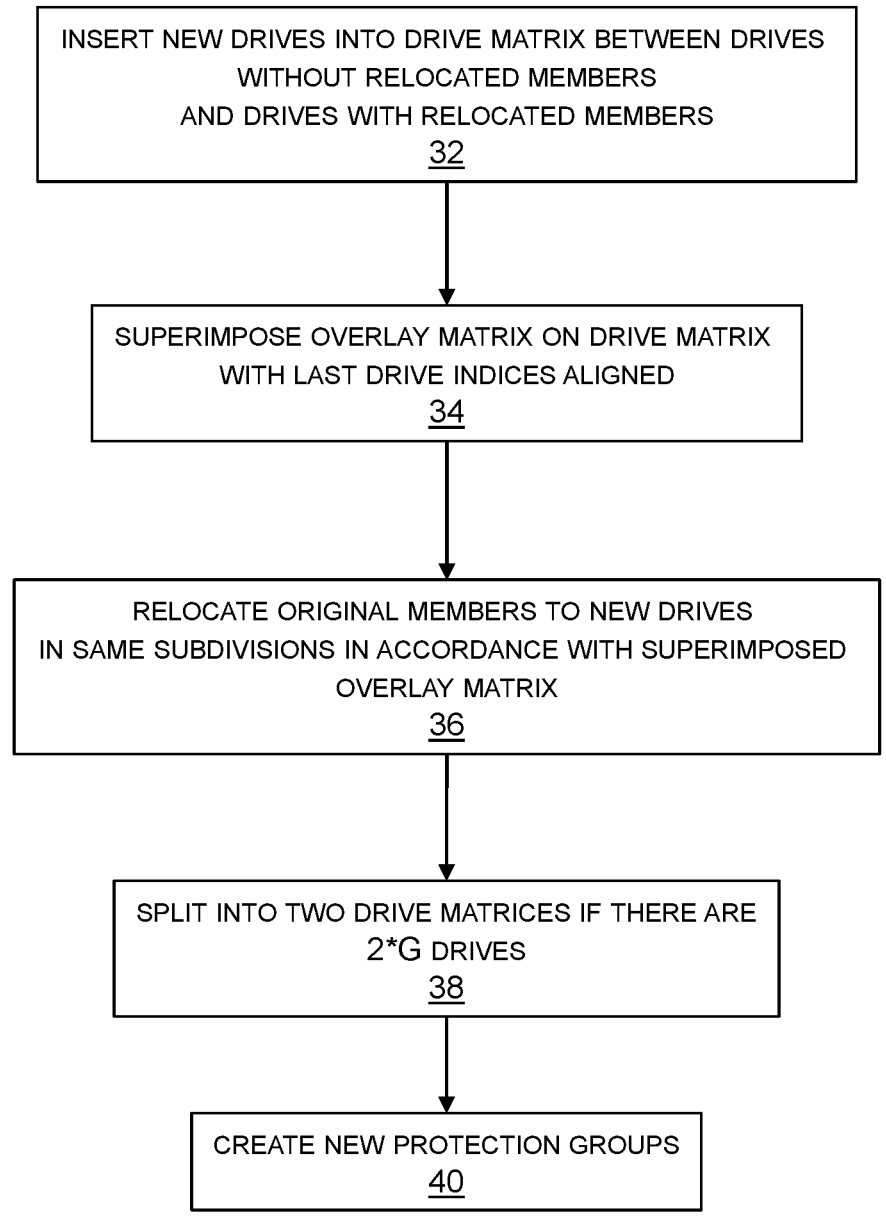
Figure 12:
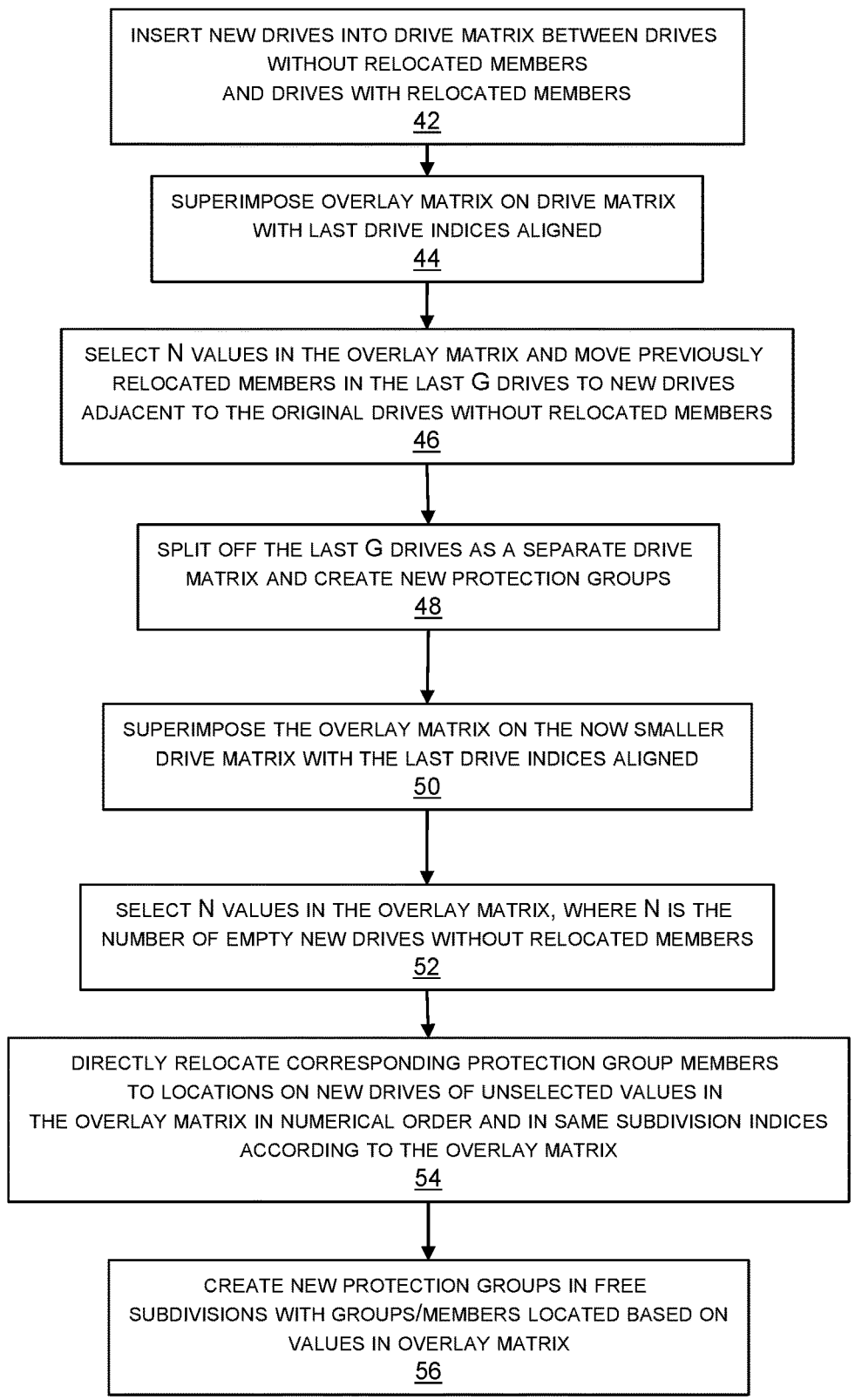

FIG. 3B illustrates use of the overlay matrix for relocation of existing protection group members for expansion of storage capacity by fewer than G new drives. When a starting drive cluster expands by G drives, relocation of existing protection group members is unnecessary because new RAID groups can be distributed vertically, column by column, in the G new drives. However, when fewer than G new drives are added it is necessary to relocate some RAID members to enable creation of new protection groups. The new drives are represented in the drive matrix by the next available sequential numbers, which are 6, 7, 8 in the illustrated example. A set of the values in the overlay matrix is selected, with the number of members in the set being equal to the number of new drives being added. In the illustrated example there are three new drives being added, so three values 0, 1, 2 are selected from the overlay matrix. The values 0, 1, 2 are the lowest values in the overlay matrix, but it is not necessary to select the lowest values. The overlay matrix is superimposed on the drive matrix such that the last rows of the matrices are aligned. In the illustrated example, the relocation matrix overlays the last 5 rows (drives) of the drive matrix, 3 of which are new rows (drives). Existing RAID members A, B, C that are superimposed by overlay matrix locations containing the selected values 0, 1, 2 are relocated to the locations superimposed by the unselected values 3, 4 within same-subdivisions while preserving vertical, column-wise order. For example, RAID member A at drive 4, subdivision 1 is relocated to drive 7, subdivision 1. Similarly, RAID member A at drive 5, subdivision 1 is relocated to drive 8, subdivision 1. The mathematics underlying the overlay matrix guarantee that the selected RAID members can be relocated vertically within the same column and only two RAID members need to be relocated to each new drive, which advantageously minimizes data movement when adding three new drives.

FIG. 4A illustrates use of the overlay matrix for location of new protection group members. After relocation of protection group members as shown in FIG. 3B, existing RAID groups occupy the overlay matrix locations of values 3, 4 and the overlay matrix locations of values 0, 1, 2 are available for 3 new RAID groups p, q, r. The members of the new protection groups are associated with the selected overlay matrix values and located at the corresponding overlay locations. In the illustrated example, protection groups p, q, r are associated respectively with selected overlay values 0, 1, 2. The p members are located where value 0 overlays the drive matrix. The q members are located where value 1 overlays the drive matrix. The q members are located where value 2 overlays the drive matrix. The result is that all subdivisions are prepared for use with minimal relocation of members of the original RAID groups A-E. Further, the locations occupied per RAID group is deterministic and predictable from a mathematical formula, using less meta-data and computing resources than heuristics.

FIG. 4B illustrates use of the overlay matrix for relocation of existing protection group members and location of new protection group members for a different number of new drives, i.e., four new drives 6, 7, 8, 9. The required amount of data movement decreases as the number of new drives increases. When four new drives are added, only one RAID member of groups A, B, C, D is relocated to each new drive 6, 7, 8, 9. After relocation, the overlay locations of selected overlay values 0, 1, 2, 3 are available for four new RAID groups p, q, r, s.

FIGS. 5A and 5B illustrate use of the overlay matrix for splitting a drive cluster into two drive clusters in response to addition of new drives. Continuing with the example shown in FIG. 4A, the expanded drive cluster includes original RAID groups A, B, C, D, E that are vertically distributed and new RAID groups p, q, r that are distributed as indicated by the overlay matrix. Further expansion is performed with the same overlay matrix, but with a reorganized drive order. Specifically, the new drives are inserted into the drive matrix between the drives that contain only original RAID group members and the other drives that do not contain only original RAID group members. In the illustrated example, new drives 9, 10 are inserted between drives 1, 2, 3, which contain only original RAID groups A-E, and drives 4, 5, 6, 7, 8, which contain members of original RAID groups A-E and all members of new RAID groups p-r. Each new drive is populated by relocating RAID members A-E from the corresponding overlay locations of groups 3, 4 in the relocation matrix. More specifically, each RAID member A-E is relocated to the new row at the same column index. Conceptually, this recreates the original drive matrix in the first G drives. After the member relocations, two more new RAID groups s, t are created using vacated overlay locations 3, 4. The resulting drive cluster is then split into two independent drive clusters containing RAID group members (A, B, C, D, E) and RAID group members (p, q, r, s, t), respectively. The non-sequentially ordered drives (1, 2, 3, 9, 10) within the first split-off drive cluster can be reindexed as drives 1-5, with the same vertical distribution of RAID groups as the original drive cluster. The first drive cluster can be the basis for a new cycle of growth and split. The other drive cluster with drives 4-8 may not be expanded.

FIGS. 6, 7 and 8 illustrate use of the overlay matrix for expansion over a split. Drive cluster expansion may involve RAID member relocations preceding and succeeding a split. In the example shown in FIG. 6, a drive cluster with nine drives 1-9 is expanded with the addition of four new drives 10, 11, 12, 13. The new drives 10-13 are inserted between the drives 1-4 that contain only original RAID group members A-E and the other drives 5-9. The first new drive (10) becomes the "temporary" target of RAID members A-E from drives 5-9. The subset of drives 5-9 will be split off with vacated space distributed diagonally for one new RAID group.

The subset of drives 1-4 and 10-13 after the split is shown in FIG. 7. The overlay matrix is used for the last five drives 4 and 10-13. Existing RAID members in the overlay locations of groups 0-2 in the upper two rows are relocated to the locations of groups 3-4 in the lower three rows. RAID members A, B, C, D, E on drive 10 are "temporarily targeted" from old drives 5-9.

As shown in FIG. 8, the RAID members A, B, C, E are relocated from drives 4, to new drives 11, 12, 13. RAID members A, B, E temporarily targeted on drive 10 are relocated from old drives 9, 8, 5 directly to drives 11-13, skipping the temporary relocation step. RAID members C, D on drive 10 are relocated from old drives 7, 6 directly. There are two relocated RAID members for each new drive 10-13. This relocation method incurs the minimum amount of data movement by skipping temporary relocation targets. The overlay locations of groups 0, 1, 2 in the overlay matrix provide the space for three new RAID groups t, u, v.

FIGS. 9 through 12 illustrate steps associated with a method performed by the RAID controller. Starting with a drive matrix of G drives, each having G same-size subdivisions as indicated in step 10, a G×G overlay matrix is created as indicated in step 12. The overlay matrix is populated with values such that the value at row R, column C equals the remainder of (R+C−2) divided by G. At some later point in time, which may be an initial or subsequent increase of storage capacity, the addition of N new drives is detected in step 14. Step 16 is creating a new drive matrix for each new cluster of G drives. The result may be zero new drive matrices because there may be fewer than G new drives. In step 17, N is modified as N=N modulo G, and N of the new drives are added to the original drive matrix. Step 18 is determining whether the existing drive matrix contains exactly G drives, and the new drive matrix contains less than 2*G drives. If so, flow processed to step 22. Otherwise, step 20 is determining whether the existing drive matrix contains more than G drives, and the (existing+new) drive count is 2*G or less. If so, flow proceeds to step 32. Otherwise, a determination is made in step 21 that the existing drive matrix contains more than G drives, and the (existing+new) drive count exceeds 2*G drives, and flow proceeds to step 42.

Step 22 is adding the new drives to the drive matrix and assigning the next available sequential drive indices to the new drives. The overlay matrix is superimposed on the drive matrix such that the highest numbered drive indices are aligned as indicated in step 24. N values are selected from the overlay matrix as indicated in step 26. The protection group members at the corresponding locations superimposed by the selected values are then relocated to the locations superimposed by the unselected values as indicated in step 28, within same-subdivisions while preserving vertical, column-wise order. Step 30 is creating new protection groups in the free subdivisions as indicated by the overlay matrix. Specifically, the members of each new protection group are associated with one of the selected overlay matrix values and located at the corresponding overlay locations.

Step 32 is inserting the new drives into the drive matrix between the drives that contain only original RAID group members and the other drives that do not contain only original RAID group members. Step 34 is superimposing the overlay matrix on the drive matrix with the last drive indices aligned. The last drive index in the drive matrix is not the highest numbered because the new drives were inserted between the drives that contain only original RAID group members and the other drives. Step 36 is relocating original RAID group members from the other drives that do not contain only original RAID group members to the new drives at the same column indices. Conceptually, this recreates the original drive matrix in the first G drives. The drive matrix can then be split into two drive matrices if there are 2*G drives, as indicated in step 38. After the relocations, additional RAID groups are created in step 40 using the technique described above.

In step 42, the new drives are inserted into the drive matrix between the drives with relocated members and the drives without relocated members. Step 44 is superimposing the overlay matrix on the drive matrix with the last drive indices aligned. Step 46 is selecting N values in the overlay matrix and moving the previously relocated members in the last G drives to new drives adjacent to the original drives without relocated members. In step 48, the last G drives are split off as a separate drive matrix and new protection groups are created in free subdivisions as indicated by the overlay matrix. Step 50 is superimposing the overlay matrix on the now smaller drive matrix remaining after the split with the last drive indices aligned. Step 52 is selecting N values in the overlay matrix, where N is the number of empty new drives without relocated members. The original members on the drives with relocated members are directly relocated to the new drives at the same column indices according to the overlay matrix as indicated in step 54. Step 56 is creating new protection groups in the free subdivisions as indicated by the overlay matrix. Specifically, the members of each new protection group are associated with one of the selected overlay matrix values and located at the corresponding overlay locations.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
  a plurality of non-volatile drives;
  at least one compute node configured to manage access of the non-volatile drives, the at least one compute node comprising at least one processor and non-transitory computer-readable memory; and
  a Redundant Array of Independent Drives (RAID) controller configured to:

organize the non-volatile drives into drive clusters, each having G non-volatile drives with G subdivisions, where G equals a number of data members and parity members of an implemented RAID level;

create a G*G drive matrix for each of the drive clusters, the drive matrix representing the corresponding drive cluster;

create a G×G overlay matrix in which a value at row R, column C equals a remainder of (R+C−2) divided by G, such that there are G distinct values in a range of 0 to G−1; and responsive to addition of N new drives to one of the drive clusters, add the N new drives to the corresponding drive matrix and use the overlay matrix to relocate RAID members within the drive matrix.

2. The apparatus of claim 1 further comprising the RAID controller configured to superimpose the overlay matrix on the corresponding drive matrix with greatest drive indices in alignment.

3. The apparatus of claim 2 further comprising the RAID controller configured to select N of the values from the overlay matrix.

4. The apparatus of claim 3 further comprising the RAID controller configured to relocate protection group members within each subdivision index from drive cluster matrix locations superimposed by the selected values of the overlay matrix to drive cluster matrix locations superimposed by unselected values of the overlay matrix.

5. The apparatus of claim 4 further comprising the RAID controller configured to create new RAID groups in subdivisions freed by relocations of protection group members and locate members of each of those RAID groups to subdivisions superimposed by one of the values of the overlay matrix.

6. The apparatus of claim 1 further comprising the RAID controller configured to insert representations of the N new drives into the corresponding drive matrix between drives without relocated protection group members and drives with relocated protection group members.

7. The apparatus of claim 6 further comprising the RAID controller configured to superimpose the overlay matrix on the corresponding drive matrix with last drive indices in alignment.

8. The apparatus of claim 7 further comprising the RAID controller configured to relocate protection group members of the G*G drive matrix within each subdivision index to one of the new drives in accordance with the values of the overlay matrix that superimpose the subdivisions of those protection group members.

9. The apparatus of claim 7 further comprising the RAID controller configured to create new RAID groups in subdivisions freed by relocations of protection group members and locate members of each of those RAID groups to subdivisions superimposed by one of the values of the overlay matrix.

10. A method comprising:

organizing non-volatile drives into drive clusters, each having G non-volatile drives with G subdivisions, where G equals a number of data members and parity members of an implemented RAID level;

creating a G*G drive matrix for each of the drive clusters, the drive matrix representing the corresponding drive cluster;

creating a G×G overlay matrix in which a value at row R, column C equals a remainder of (R+C−2) divided by G, such that there are G distinct values in a range of 0 to G−1; and responsive to addition of N new drives to one of the drive clusters, adding the N new drives to the corresponding drive matrix and using the overlay matrix to relocate RAID members within the drive matrix.

11. The method of claim 10 further comprising superimposing the overlay matrix on the corresponding drive matrix with greatest drive indices in alignment.

12. The method of claim 11 further comprising selecting N of the values from the overlay matrix.

13. The method of claim 12 further comprising relocating protection group members within each subdivision index from drive cluster matrix locations superimposed by the selected values of the overlay matrix to drive cluster matrix locations superimposed by unselected values of the overlay matrix.

14. The method of claim 13 further comprising creating new RAID groups in subdivisions freed by relocations of protection group members and locate members of each of those RAID groups to subdivisions superimposed by one of the values of the overlay matrix.

15. The method of claim 14 further comprising inserting representations of the N new drives into the corresponding drive matrix between drives without relocated protection group members and drives with relocated protection group members.

16. The method of claim 15 further comprising superimposing the overlay matrix on the corresponding drive matrix with last drive indices in alignment.

17. The method of claim 16 further comprising relocating protection group members of the G*G drive matrix within each subdivision index to one of the new drives in accordance with the values of the overlay matrix that superimpose the subdivisions of those protection group members.

18. The method of claim 17 further comprising creating new RAID groups in subdivisions freed by relocations of protection group members and locate members of each of those RAID groups to subdivisions superimposed by one of the values of the overlay matrix.

19. The method of claim 18 further comprising splitting the drive cluster into two separate drive clusters.

20. A non-transitory computer-readable storage medium with instructions that when executed by a computer perform a method comprising:

organizing non-volatile drives into drive clusters, each having G non-volatile drives with G subdivisions, where G equals a number of data members and parity members of an implemented RAID level;

creating a G*G drive matrix for each of the drive clusters, the drive matrix representing the corresponding drive cluster;

creating a G×G overlay matrix in which a value at row R, column C equals a remainder of (R+C−2) divided by G, such that there are G distinct values in a range of 0 to G−1; and responsive to addition of N new drives to one of the drive clusters, adding the N new drives to the corresponding drive matrix and using the overlay matrix to relocate RAID members within the drive matrix.

* * * * *